(12) United States Patent
Nishimoto

(10) Patent No.: US 10,940,746 B2
(45) Date of Patent: Mar. 9, 2021

(54) DOOR WEATHER STRIP

(71) Applicant: NISHIKAWA RUBBER CO., LTD., Hiroshima (JP)

(72) Inventor: Yoshitaka Nishimoto, Hiroshima-ken (JP)

(73) Assignee: NISHIKAWA RUBBER CO., LTD., Hiroshima-Ken (JP)

( * ) Notice: Subject to any disclaimer, the term of this patent is extended or adjusted under 35 U.S.C. 154(b) by 222 days.

(21) Appl. No.: 16/181,317

(22) Filed: Nov. 5, 2018

(65) Prior Publication Data

US 2019/0135096 A1 May 9, 2019

(30) Foreign Application Priority Data

Nov. 6, 2017 (JP) .............................. JP2017-214049

(51) Int. Cl.
*B60J 10/86* (2016.01)
*B60J 10/78* (2016.01)
*B60J 10/75* (2016.01)
*B60J 10/50* (2016.01)

(52) U.S. Cl.
CPC .............. *B60J 10/86* (2016.02); *B60J 10/50* (2016.02); *B60J 10/75* (2016.02); *B60J 10/78* (2016.02)

(58) Field of Classification Search
CPC ... B60J 10/86; B60J 10/78; B60J 10/75; B60J 10/50
See application file for complete search history.

(56) References Cited

U.S. PATENT DOCUMENTS

| 10,406,902 | B2 * | 9/2019 | Masumoto | ............. B60J 5/0402 |
| 2005/0028448 | A1 * | 2/2005 | Mizutani | .................. B60J 10/25 |
| | | | | 49/479.1 |
| 2015/0082709 | A1 * | 3/2015 | Dosaki | ..................... B60J 10/50 |
| | | | | 49/490.1 |
| 2015/0283888 | A1 * | 10/2015 | Togashi | ................... B60J 10/15 |
| | | | | 49/480.1 |
| 2017/0136861 | A1 * | 5/2017 | Kojima | ..................... B60J 10/50 |
| 2017/0274749 | A1 * | 9/2017 | Nawate | .................... B60J 10/86 |
| 2019/0047391 | A1 * | 2/2019 | Kamitani | ................. B60J 10/86 |

FOREIGN PATENT DOCUMENTS

| JP | 3328737 B2 | 9/2002 | |
| JP | 2009107397 A | * 5/2009 | |
| WO | WO-9625299 A1 | * 8/1996 | ............. B29C 48/12 |

* cited by examiner

*Primary Examiner* — Marcus Menezes
(74) *Attorney, Agent, or Firm* — Holtz, Holtz & Volek PC

(57) ABSTRACT

A door weather strip couples to a door adjacently to a belt line. The door weather strip includes: a fin at a bottom of the door weather strip; a main seal and a sub seal which extend vertically in upper and lower directions on an internal circumference and an outer circumference on a surface of the fin and which make elastic contact with an end of a roof weather strip when the door is in a closed position; a channel between the main seal and the sub seal; and a sealing wall which extends between a top end of the main seal and a part of the sub seal below a top end by a distance such that the sealing wall on the sub seal is spaced from the end of the roof weather strip when the door is in the closed position.

12 Claims, 7 Drawing Sheets

DOOR WEATHER STRIP

CROSS REFERENCE TO RELATED APPLICATION

This application claims the benefit under 35 USC § 119 of JP Patent Application JP 2017-214049 filed Nov. 6, 2017, the entire disclosure of which is incorporated herein by reference.

BACKGROUND INFORMATION

The present invention relates to door weather strips, and more particularly, to a door weather strip configured to operably couple to a front door of a hard top vehicle or an open car adjacently to an installation member of a door mirror 90 near a belt line 80, wherein the door weather strip is includes a main seal and a sub seal and makes elastic contact with a roof weather strip.

As shown in FIG. 9 to FIG. 11, a door weather strip 10 is configured to operably couple to a front door 100 of the hard top vehicle adjacently to the installation member of the door mirror 90 near the belt line 80.

The door weather strip 10 includes a fin 11 at a bottom. The fin 11 includes a main seal 12 on an internal circumference on a surface and a sub seal 13 on an outer circumference on the surface. The main seal 12 and the sub seal 13 extend vertically in an upper and lower direction.

The main seal 12 and the sub seal 13 have substantially U-shaped cross sections and are hollow in cross sections. When the door 100 is in a closed position, the main seal 12 and the sub seal 13 are configured to make elastic contact with an end of a roof weather strip 20 on a circumferential edge of a door opening of an automobile body for doubly sealing a gap between the door and the automobile body.

The main seal 12 and the sub seal 13 of the door weather strip 10 form a channel 40 which extends vertically in the upper and lower direction. This configuration allows the wind from a lower side to blow up through the channel 40 and causes noise.

In this connection, providing a noise insulation seal between the main seal 12 and the sub seal 13 has been known to shut out the noise by the wind blowing up through the channel 40 (see, for example, Japanese Patent No. 3328737).

Also, providing the roof weather strip 20, not the door weather strip 10, with a pad as an extra member has been known to shut out the noise by the wind blowing up between the seals. The roof weather strip 20 makes elastic contact with the main seal 12 and the sub seal 13 of the door weather strip 10.

The noise insulation seal of Japanese Patent No. 3328737, however, merely blocks up the channel between the main seal 12 and the sub seal 13 without a space. Accordingly, the noise insulation seal is excellent in noise insulation performance, but in case water climbs over the sub seal 13 and flows along the channel between the main seal 12 and the sub seal 13, the noise insulation seal dams up the flow of water along the channel and allows entrance of the water toward an interior of the automobile.

Also, providing the automobile body (roof weather strip) with the pad degrades appearance for the pad is exposed toward an exterior when the door 100 is in an open position.

Accordingly, an object of the present invention is to provide the door weather strips excellent in water-tightness and appearance as well as the noise insulation performance.

SUMMARY

In order to achieve the above-mentioned object, according to one aspect of the invention, a door weather strip (10) is provided. The door weather strip (10) is configured to operably couple to a door (100) of an automobile adjacently to a belt line (80). The door weather strip (10) includes: a fin (11); a main seal (12); a sub seal (13); a channel (40); and a sealing wall (50).

The fin (11) is at a bottom of the door weather strip (10).

The main seal (12) is on an internal circumference on a surface of the fin (11). The main seal (12) extends vertically in an upper and lower direction. The main seal (12) has a top end (12a). The sub seal (13) is on an outer circumference on the surface of the fin (11). The sub seal (13) extends vertically in the upper and lower direction. The sub seal (13) has a top end (13a). The main seal (12) and the sub seal (13) are configured to make elastic contact with an end of a roof weather strip (20) on a circumferential edge of a door opening of an automobile body and seal a gap between the door (100) and the automobile body when the door (100) is in a closed position.

The channel (40) is between the main seal (12) and the sub seal (13).

The sealing wall (50) is configured to block up the channel (40). The sealing wall (50) connects the main seal (12) and the sub seal (13). The sealing wall (50) extends between the top end (12a) of the main seal (12) and a part (64) of the sub seal (13). The part (64) of the sub seal (13) is below the top end (13a) of the sub seal (13) by a gap (70). The sealing wall (50) on the sub seal (13) is spaced from the end of the roof weather strip (20) when the door (100) is in the closed position.

In addition, according to an aspect of the present invention, the sealing wall (50) between the main seal (12) and the sub seal (13) gradually slopes such that a lower part of the sealing wall (50) rises from the fin (11) and approaches the top end (12a) of the main seal (12) and the top end (13a) of the sub seal (13).

In addition, according to an aspect of the present invention, a third intersection (63) of the sealing wall (50) is lower than a first intersection (61) of the sealing wall (50), a distance (413) between the first intersection (61) and the third intersection (63) is wider than a width (45) of the channel (40). The first intersection (61) is on a base root of the main seal (12) on an upper side of the main seal (12). The main seal (12) is on the surface of the fin (11). The third intersection (63) is on a base root of the sub seal (13) on an upper side of the sub seal (13). The sub seal (13) is on the surface of the fin (11).

In addition, according to an aspect of the present invention, a distance (434) between the third intersection (63) of the sealing wall (50) with the upper side of the sub seal (13) and a fourth intersection (64) of the sealing wall (50) with the lower side of the sub seal (13) is wider than a distance (412) between the first intersection (61) of the sealing wall (50) with the upper side of the main seal (12) and a second intersection (62) of the sealing wall (50) with a lower side of the main seal (12). The second intersection (62) is on the top end (12a) of the main seal (12) on the lower side of the main seal (12). The fourth intersection (64) is slightly below the top end (13a) of the sub seal (13) on the lower side of the sub seal (13).

In addition, according to an aspect of the present invention, the fourth intersection (64) of the sealing wall (50) is lower than the second intersection (62) of the sealing wall (50), and a bottom (50a) of the sealing wall (50) gradually slopes downward, toward an exterior of the automobile body (the outer circumference of the door) on a part of the sealing wall (50) closer to a front of the automobile body.

In addition, according to an aspect of the present invention, the sealing wall (50) is a plate and forms a space (51) between the sealing wall (50) and the fin (11). The space (51) has a shape of a bag.

Symbols in parentheses show constituents or items corresponding to the drawings.

According to the present invention, the fin at the bottom of the door weather strip includes the main seal, the sub seal, and the sealing wall. The main seal and the sub seal are on the internal circumference and the outer circumference on the surface of the fin, respectively, and extend vertically in the upper and lower direction. The sealing wall blocks up the channel between the main seal and the sub seal. With this configuration, the sealing wall shuts out most of the wind which blows up through the channel from the lower side.

Also, the sealing wall extends between the top end of the main seal and the part of the sub seal below the top end of the sub seal. That is, the distance between the top end of the sub seal and the part of the sub seal separates the part from the top end. Accordingly, the sealing wall does not block up the channel completely. With this configuration, in case water flows along the channel between the main seal and the sub seal, the distance between the sealing wall and the top end of the sub seal guides the water toward a lower part of the door and prevents entrance of the water toward the interior of the automobile.

The sealing wall between the main seal and the sub seal, which is configured not to block up the channel completely, performs an excellent sealing performance as well as an excellent noise insulation performance.

Also, the sealing wall gradually slopes such that the lower part of the sealing wall rises from the fin and approaches the top end of the main seal and the top end of the sub seal. The slope of the sealing wall temporarily slows speed of the water which flows along the channel between the main seal and the sub seal and simplifies collection of the water. This configuration certainly guides water even in case the distance between the sealing wall and the top end of the sub seal is short.

In addition, the third intersection of the sealing wall is lower than the first intersection, and the distance between the first intersection and the third intersection is wider than the width of the channel. With this configuration, an upper part of the sealing wall guides the water, which flows along the channel between the main seal and the sub seal, toward the exterior of the automobile.

In addition, the distance between the third intersection of the sealing wall with the upper side of the sub seal and the fourth intersection of the sealing wall with the lower side of the sub seal is wider than the distance between the first intersection of the sealing wall with the upper side of the main seal and the second intersection of the sealing wall with the lower side of the main seal. In addition, the fourth intersection of the sealing wall is lower than the second intersection, and the bottom of the sealing wall gradually slopes downward, toward the exterior of the automobile body (the outer circumference of the door) on the part of the sealing wall closer to the front of the automobile body. At least one of these two configurations more certainly guides water, which flows along the channel between the main seal and the sub seal, to the distance between the sealing wall and the top end of the sub seal without damming up the flow of the water. This configuration further prevents entrance of the water toward the interior of the automobile.

In addition, the sealing wall is the plate and forms the space, which has the shape of the bag, between the sealing wall and the fin. Accordingly, as compared with a configuration that the space which has the shape of the bag is filled up, this configuration less affects sealing performance, is more excellent in door closability, and lowers cost of materials.

DETAILED DESCRIPTION

Figure 10:
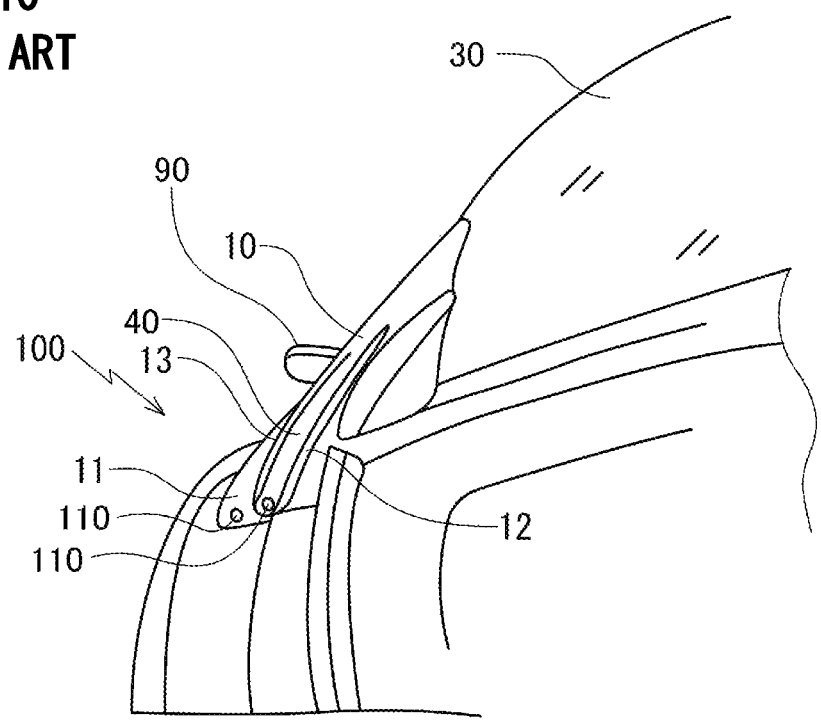
FIG. 10 is a perspective view of an open front door of an automobile, showing a door weather strip according to a prior art configuration.
Figure 11:
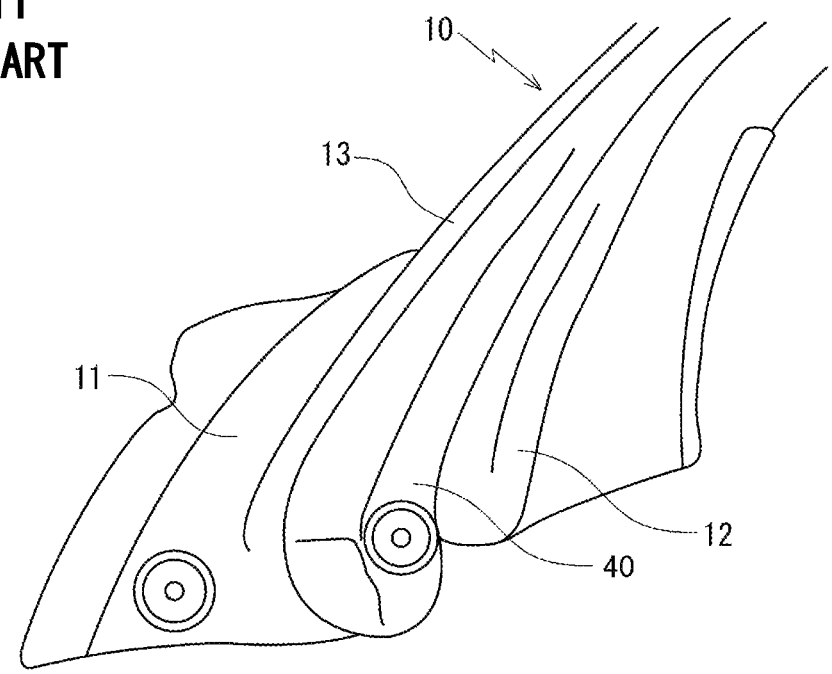
FIG. 11 is an enlarged perspective view of the door weather strip of FIG. 10.

Referring to the drawings, a door weather strip 10 according to an embodiment of the present invention will be described. The door weather strip 10 includes a sealing wall 50 added to a door weather strip according to a prior art (FIG. 10, FIG. 11). When constituents or items correspond to those in prior arts, the same symbols are used.

As shown in FIGS. 1 to 3 and FIG. 9, the door weather strip 10 is configured to operably couple to a front door 100 of a hard top vehicle adjacently to an installation member of a door mirror 90 near the belt line 80. The door weather strip 10 includes a fin 11 at a bottom.

The fin 11 includes a main seal 12 and a sub seal 13 on a surface which faces an interior of an automobile when the front door 100 is in a closed position. The main seal 12 on an internal circumference on the surface and the sub seal 13 on an outer circumference on the surface extend vertically in an upper and lower direction and are spaced from each other. As shown in FIG. 4 (an enlarged cross-sectional view taken along a line IV-IV of FIG. 3) and FIG. 5 (an enlarged cross-sectional view taken along a line V-V of FIG. 3), the main seal 12 and the sub seal 13 have substantially U-shaped cross sections, hollow cross sections in other words, and extend toward the interior of the automobile when the front door 100 is in the closed position. The fin 11 is uneven, not plane, and includes stairs.

Detailed explanations on the fin 11 are omitted. Basically, a top end of the fin 11 is slidably brought into contact with a door glass 30 while the door glass 30 is being lifted or lowered, and a bottom of the fin 11 is fixed on a door panel by a clip 110.

When the door 100 is in the closed position, the main seal 12 and the sub seal 13 are configured to make elastic contact with an end of a roof weather strip 20 on a circumferential edge of a door opening of an automobile body for sealing a gap between the door and the automobile body.

The sealing wall 50 is configured to block up a channel 40 between the main seal 12 and the sub seal 13. The channel 40 has a substantially U-shaped cross section.

The sealing wall 50 is a plate and connects the main seal 12 and the sub seal 13. The sealing wall 50 on the sub seal 13 is separated by a gap 70 from a top end 13a of the sub seal 13 such that the sealing wall 50 does not block up a channel 40 completely.

Figure 1:
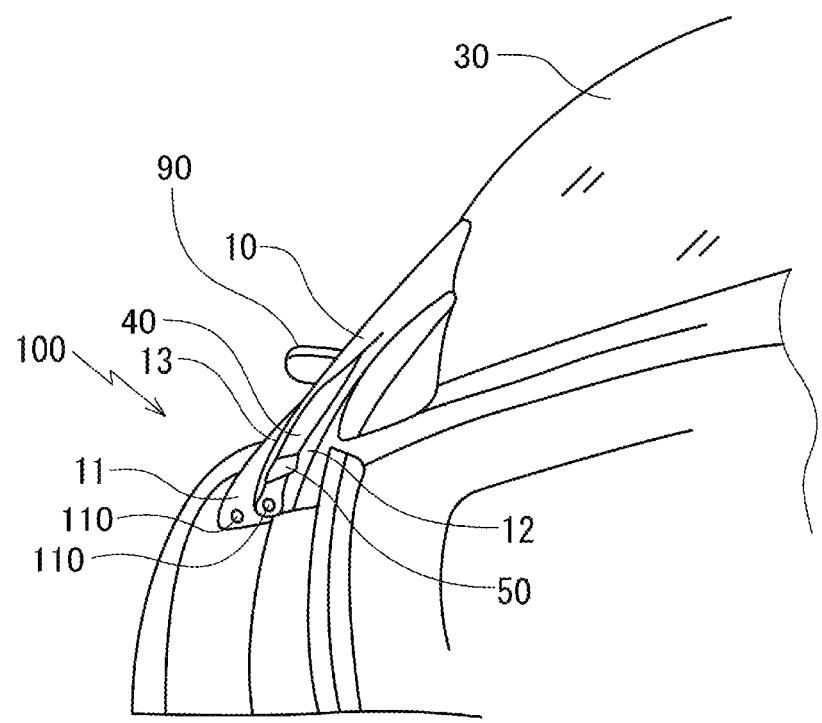
FIG. 1 is a perspective view of an open front door of an automobile, showing a door weather strip according to an embodiment of the present invention.
Figure 2:
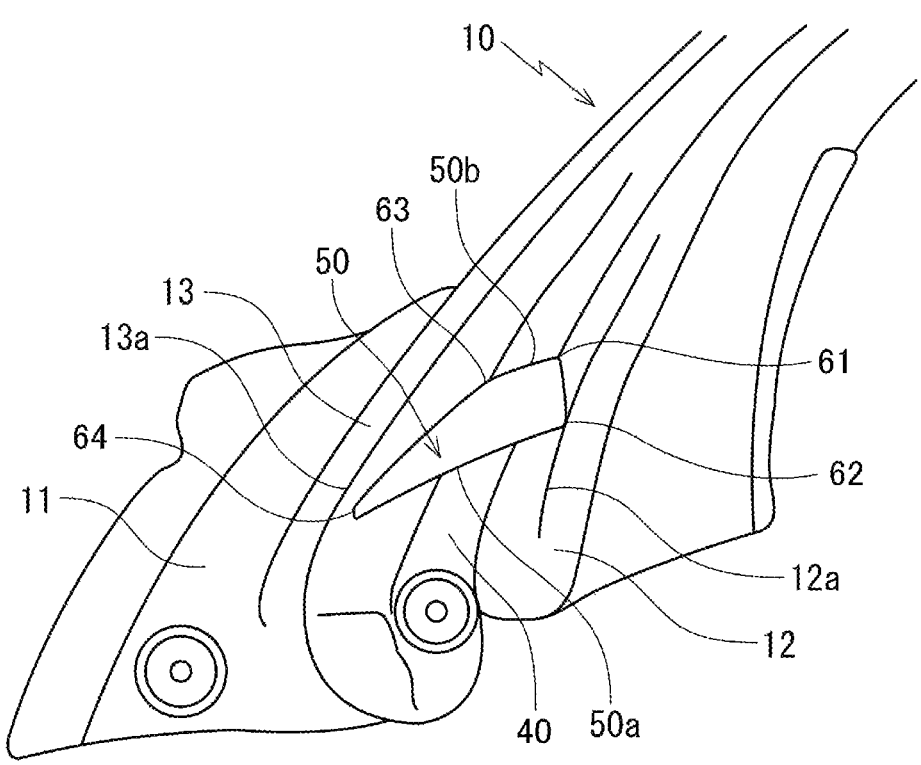
FIG. 2 is an enlarged perspective view of the door weather strip of FIG. 1.
Figure 3:
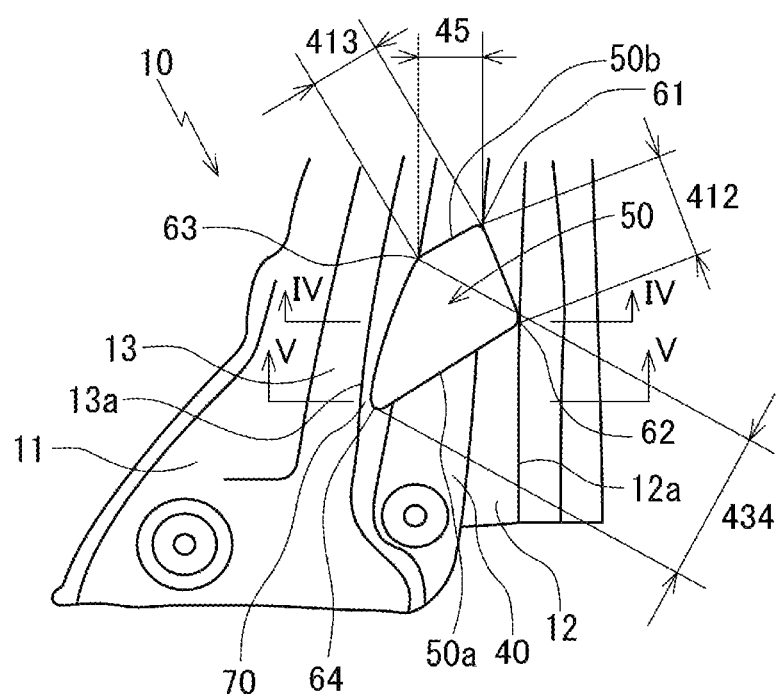
FIG. 3 is an enlarged plan view of the door weather strip of FIG. 1.
Figure 4:
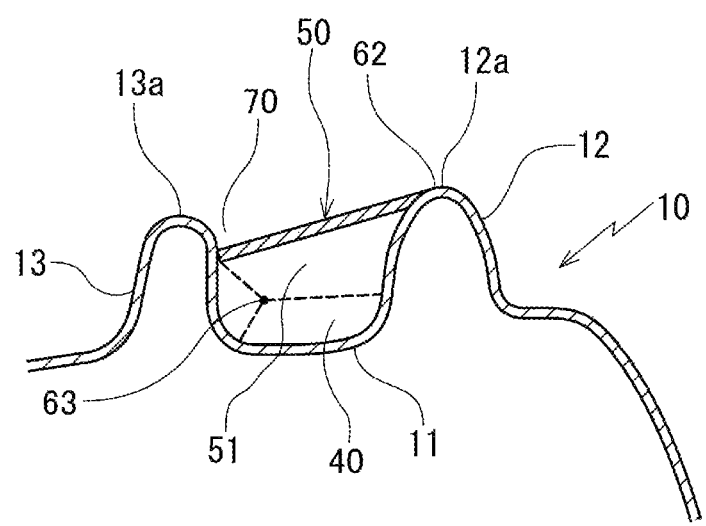
FIG. 4 is an enlarged cross-sectional view of the door weather strip taken along a line IV-IV of FIG. 3.
Figure 5:
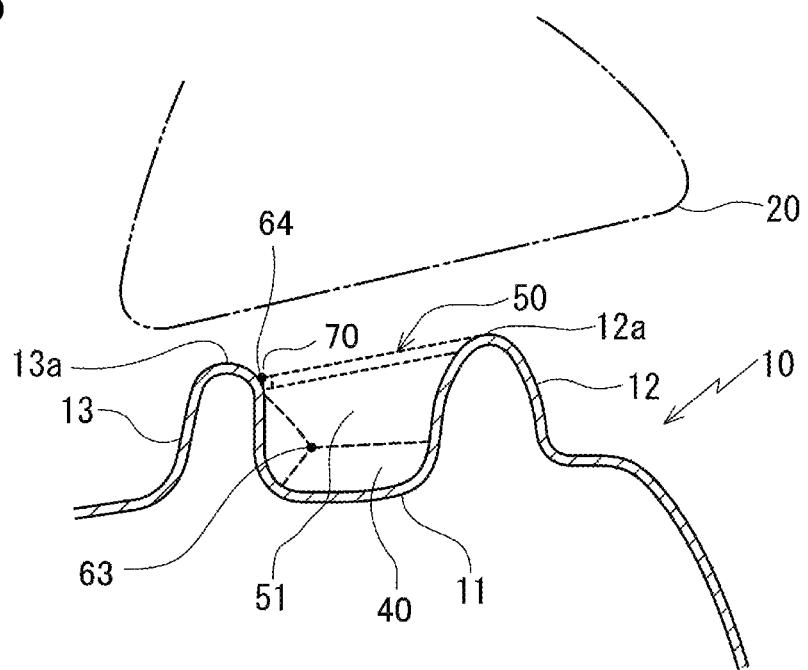
FIG. 5 is an enlarged cross-sectional view of the door weather strip taken along a line V-V of FIG. 3.

In other words, as shown in FIGS. 2, 3, 5, the sealing wall 50 extends between a top end 12a of the main seal 12 and a part 64 (fourth intersection to be discussed later) of the sub seal 13 below the top end 13a. In the present embodiment, the distance between the top end 13a of the sub seal 13 and the part 64 on the sub seal 13 is substantially within a range of ¼ to ⅙ of distance between the surface of the fin 11 and the top end 13a of the sub seal 13 through the part 64.

More specifically, as shown in FIGS. 2, 3, the sealing wall 50 connects four intersections, a first intersection 61, a second intersection 62, a third intersection 63, and the fourth intersection 64. The sealing wall 50 between the main seal 12 and the sub seal 13 gradually slopes such that a lower part of the sealing wall 50 rises from the fin 11 and approaches the top end 12a of the main seal 12 and the top end 13a of the sub seal 13. As shown in FIG. 4 and FIG. 5, the sealing wall 50 is the plate and forms a space 51 between the sealing wall 50 and the surface of the fin 11. The space 51 has a shape of a bag and a bottom of the space 51 is opened toward a lower side.

The first intersection 61 is on a base root of the main seal 12 on an upper side of the main seal 12. The main seal 12 is on the surface of the fin 11.

The second intersection 62 is on the top end 12a of the main seal 12 on a lower side of the main seal 12.

The third intersection 63 is on a base root of the sub seal 13 on an upper side of the sub seal 13. The sub seal 13 is on the surface of the fin 11.

The fourth intersection 64 is slightly below the top end 13a of the sub seal 13 on the lower side of the sub seal 13.

In the present embodiment, as shown in FIG. 3, a distance 434 between the third intersection 63 and the fourth intersection 64 on the sub seal 13 is wider than a distance 412 between the first intersection 61 and the second intersection 62 on the main seal 12.

The fourth intersection 64 is lower than the second intersection 62. A bottom 50a (side between the second intersection 62 and the fourth intersection 64) of the sealing wall 50 gradually slopes downward, toward an exterior of the automobile body, which is the outer circumference of the front door 100, on a part of the sealing wall 50 closer to a front of the automobile body when the front door 100 is in a closed position.

Also, the third intersection 63 is lower than the first intersection 61. A top end 50b (side between the first intersection 61 and the third intersection 63) of the sealing wall 50 gradually slopes downward, toward the exterior of the automobile body, which is the outer circumference of the front door 100, on the part of the sealing wall 50 closer to the front of the automobile body when the front door 100 is in the closed position. The distance 413 between the first intersection 61 and the third intersection 63 is wider than a width 45 of the channel 40.

In the present embodiment, a distance 412 between the first intersection 61 and the second intersection 62 is substantially 1.5 times as wide as the distance 413 between the first intersection 61 and the third intersection 63. Also, the distance 434 between the third intersection 63 and the fourth intersection 64 is substantially twice as wide as the distance 413 between the first intersection 61 and the third intersection 63.

Figure 6:
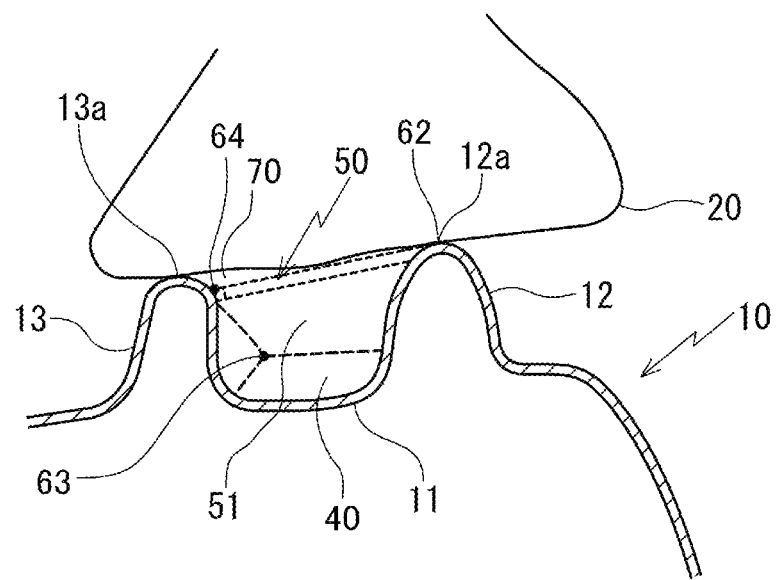
FIG. 6 is the enlarged cross-sectional view of the door weather strip taken along the line V-V of FIG. 3, with the door weather strip of FIG. 5 making elastic contact with a roof weather strip.

As shown in FIG. 6, when the door 100 is in the closed position, the main seal 12 and the sub seal 13 make elastic contact with an end of a roof weather strip 20 on a circumferential edge of a door opening of an automobile body and seal a gap between the door 100 and the automobile body. The main seal 12 is on the internal circumference on the surface of the fin 11 and the sub seal 13 is on the outer circumference on the surface of the fin 11. The fin 11 is at the bottom of the door weather strip 10. As the main seal 12 comes into elastic contact with the end of the roof weather strip 20, the main seal 12 forms a line of the main seal 12. The line of the main seal 12 extends vertically in an upper and lower direction of the automobile body. As the sub seal 13 comes into elastic contact with the end of the roof weather strip 20, the sub seal 13 forms a line of the sub seal 13. The line of the sub seal 13 extends vertically in the upper and lower direction of the automobile body.

This configuration maintains the gap 70 between the top end 13a of the sub seal 13 and the sealing wall 50 even after the main seal 12 and the sub seal 13 come into elastic contact with the roof weather strip 20. With this configuration, the gap 70 guides the water, which flows along the channel 40 between the main seal 12 and the sub seal 13, toward a lower part on a front side of the front door 100.

The fin 11 at the bottom of the door weather strip 10 according to the embodiment of the present invention includes the main seal 12, the sub seal 13, and the sealing wall 50. The main seal 12 and the sub seal 13 are on the internal circumference and the outer circumference on the surface of the fin 11, respectively, and extend vertically in the upper and lower direction. The sealing wall 50 blocks up the channel 40 between the main seal 12 and the sub seal 13. With this configuration, the sealing wall 50 shuts out most of the wind which blows up through the channel 40 from the lower side.

Also, the sealing wall 50 extends between the top end 12a (second intersection 62) of the main seal 12 and the part (fourth intersection 64) of the sub seal 13 below the top end 13a of the sub seal 13. That is, the gap 70, which is between the top end 13a of the sub seal 13 and the part 64 on the sub seal 13, separates the part 64 from the top end 13a such that the sealing wall 50 does not block up the channel 40 completely. With this configuration, in case the water flows along the channel 40 between the main seal 12 and the sub seal 13 while the roof weather strip 20 makes elastic contact with the main seal 12 and the sub seal 13 with the sealing wall 50 above the channel 40, the gap 70 between the sealing wall 50 and the top end 13a of the sub seal 13 guides the water toward the lower part of the door 100. This configuration, which does not dam up the flow of the water, prevents entrance of the water toward the interior of the automobile.

The sealing wall 50 between the main seal 12 and the sub seal 13, which is configured not to block up the channel 40 completely, performs an excellent sealing performance as well as an excellent noise insulation performance.

Also, the sealing wall 50 gradually slopes such that the lower part of the sealing wall 50 rises from the fin 11 and approaches the top end 12a of the main seal 12 and the top end 13a of the sub seal 13. The slope of the sealing wall 50 temporarily slows speed of the water which flows along the channel 40 between the main seal 12 and the sub seal 13 and simplifies collection of the water. This configuration certainly guides water even in case the gap 70 between the sealing wall 50 and the top end 13a of the sub seal 13 is short.

As shown in FIG. 3, the third intersection 63 is lower than the first intersection 61, and the distance 413 between the first intersection 61 and the third intersection 63 is wider than the width 45 of the channel 40. With this configuration, the upper part of the sealing wall 50 guides the water, which flows along the channel 40 between the main seal 12 and the sub seal 13, toward the exterior of the automobile.

In addition, the distance 434 between the third intersection 63 of the sealing wall 50 with the upper side of the sub seal 13 and the fourth intersection 64 of the sealing wall 50 with the lower side of the sub seal 13 is wider than the distance 412 between the first intersection 61 of the sealing wall 50 with the upper side of the main seal 12 and the second intersection 62 of the sealing wall 50 with the lower side of the main seal 12. In addition, the fourth intersection 64 of the sealing wall 50 is lower than the second intersection 62, and the bottom 50a of the sealing wall 50 gradually slopes downward, toward the exterior of the automobile body, which is the outer circumference of the front door 100, on the part of the sealing wall 50 closer to the front of the automobile body. At least one of these two configurations more certainly guides water, which flows along the channel 40 between the main seal 12 and the sub seal 13 toward the surface of the sealing wall 50, to the lower part of the door 100 through the gap 70 between the sealing wall 50 and the top end 13a of the sub seal 13. This configuration does not dam up the flow of the water and further prevents entrance of the water toward the interior of the automobile.

In addition, the sealing wall 50 is the plate and forms the space 51, which has the shape of the bag, between the sealing wall 50 and the fin 11. Accordingly, as compared with the space 51 which has the shape of the bag and which is filled up, this configuration less affects sealing performance, is more excellent in door closability, and lowers cost of materials.

Figure 7:
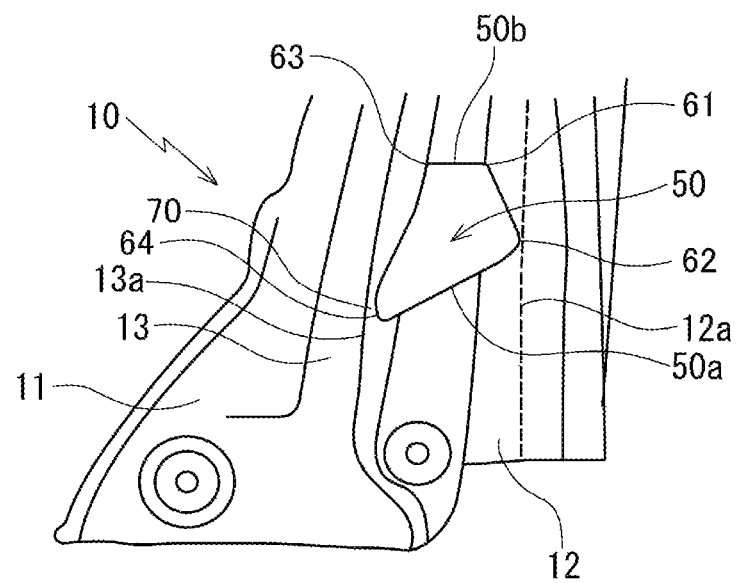
FIG. 7 is a plan view of another door weather strip according to an embodiment of the present invention.
Figure 8:
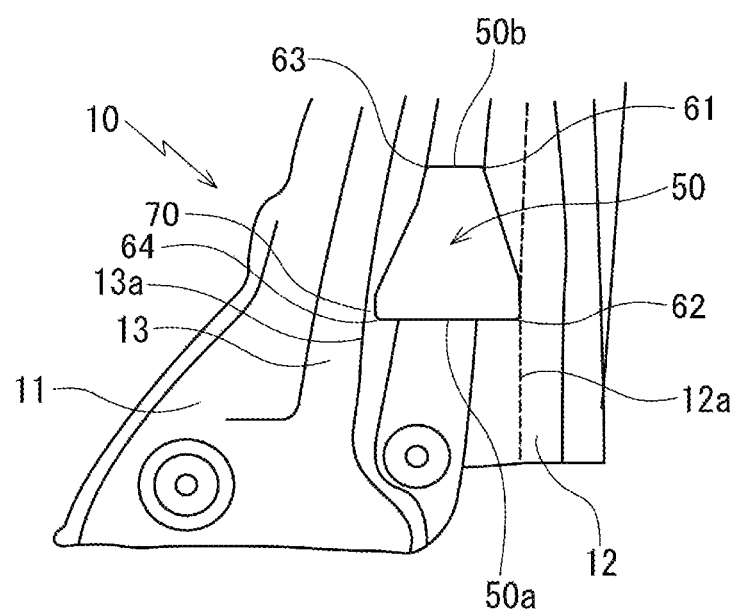
FIG. 8 is a plan view of still another door weather strip according to an embodiment of the present invention.

In the present embodiment, the third intersection 63 is lower than the first intersection 61. But, as shown in FIG. 7, the third intersection 63 and the first intersection 61 may be made to be the same height. Also, as shown in FIG. 8, the fourth intersection 64 and the second intersection 62 as well as the third intersection 63 and the first intersection 61 may be made to be the same height.

In the present embodiment, the gap 70 as an escape route for the water which flows along the channel 40 is formed between the sealing wall 50 and the sub seal 13. Alternatively, the gap 70 may be formed between the sealing wall 50 and the main seal 12 or between the main seal 12 and the sub seal 13 depending on a shape of the sealing wall 50. But, the configuration of the present embodiment, in which the gap 70 is between the sealing wall 50 and the sub seal 13, is more preferable because this configuration moves water further toward the exterior of the automobile (the outer circumference of the door) and further prevents entrance of the water toward the interior of the automobile. This is because the sub seal 13, which is on the outer circumference of the front door 100, is closer to the exterior of the automobile body than the main seal 12, which is on the internal circumference of the front door 100.

The present embodiment accepts any elastic materials for use as the fin 11, the main seal 12, the sub seal 13, and the sealing wall 50. But it is preferable to use EPDM (ethylene-propylene-diene terpolymer) of rubber materials or TPO (olefin thermoplastic elastomer) of resin materials. EPDM and TPO may be foamed or non-foamed.

Figure 9:
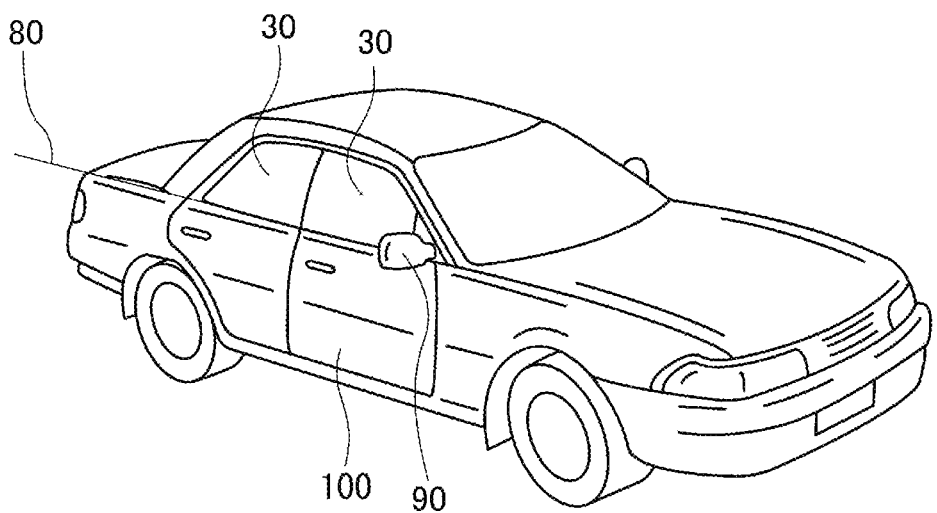
FIG. 9 is an external perspective view of the automobile.

While in this embodiment the automobile is a hard top vehicle illustrated in FIG. 9, this should not be construed in a limiting sense. The present invention is applicable to any door weather strips, which are configured to operably couple to frames of the front doors, of open cars for example, which include the main seal and the sub seal, and which make elastic contact with the roof weather strip.

While in this embodiment the door weather strip is formed only of a die molded part which is formed by die molding, this should not be construed in a limiting sense. Another possible embodiment is, as illustrated in FIG. 2 and FIG. 7 of Japanese Patent No. 3328737, the door weather strip includes a hollow seal member which is formed by extrusion molding and unified with the die molded part and the door weather strip is configured to operably couple to the whole circumference of the door panel below the belt line 80.

While in this embodiment the door weather strip is configured to operably couple to the front door adjacently to the installation member of a door mirror 90 near the belt line 80, this should not be construed in a limiting sense. Another possible embodiment is that, as indicated by "A", "C" in FIG. 1 and FIG. 2 of Japanese Patent No. 3328737, the door weather strip is arranged on a rear side of the front door, a front side of a rear door, a rear side of the rear door.

We claim:
1. A door weather strip configured to operably couple to a door of an automobile adjacently to a belt line, the door weather strip comprising:
a fin at a bottom of the door weather strip;
a main seal on an internal circumference on a surface of the fin, the main seal extending vertically in an upper and lower direction, the main seal having a top end;
a sub seal on an outer circumference on the surface of the fin, the sub seal extending vertically in the upper and lower direction, the sub seal having a top end, the main seal and the sub seal being configured to make elastic contact with an end of a roof weather strip on a circumferential edge of a door opening of an automobile body of the automobile to seal a gap between the door and the automobile body when the door is in a closed position;
a channel between the main seal and the sub seal; and
a sealing wall configured to block up the channel, the sealing wall connecting the main seal and the sub seal, the sealing wall extending between the top end of the main seal and a part of the sub seal, the part of the sub seal being below the top end of the sub seal by a distance, such that the sealing wall on the sub seal is spaced from the end of the roof weather strip when the door is in the closed position,
wherein a third intersection of the sealing wall is lower than a first intersection of the sealing wall, and a distance between the first intersection and the third intersection is wider than a width of the channel, the first intersection being an intersection of the sealing wall with the main seal on a base root of the main seal on an upper side of the main seal, and the third intersection being an intersection of the sealing wall with the sub seal on a base root of the sub seal on an upper side of the sub seal.

2. The door weather strip as claimed in claim 1, wherein the sealing wall is a plate and forms a space between the sealing wall and the fin.

3. The door weather strip as claimed in claim 2, wherein the sealing wall between the main seal and the sub seal gradually slopes such that a lower part of the sealing wall rises from the fin and approaches the top end of the main seal and the top end of the sub seal.

4. The door weather strip as claimed in claim 2, wherein a fourth intersection of the sealing wall is lower than a second intersection of the sealing wall, the second intersection being an intersection of the sealing wall with the main seal on the top end of the main seal on a lower side of the main seal, and the fourth intersection being an intersection of the sealing wall with the sub seal below the top end of the sub seal on a lower side of the sub seal, and wherein a bottom of the sealing wall gradually slopes downward, toward an exterior of the automobile body on a part of the sealing wall closer to a front of the automobile body.

5. The door weather strip as claimed in claim 1, wherein the sealing wall between the main seal and the sub seal gradually slopes such that a lower part of the sealing wall rises from the fin and approaches the top end of the main seal and the top end of the sub seal.

6. The door weather strip as claimed in claim 1, wherein a fourth intersection of the sealing wall is lower than a second intersection of the sealing wall, the second intersection being an intersection of the sealing wall with the main seal on the top end of the main seal on a lower side of the main seal, and the fourth intersection being an intersection of the sealing wall with the sub seal below the top end of the sub seal on a lower side of the sub seal, and wherein a bottom of the sealing wall gradually slopes downward, toward an exterior of the automobile body on a part of the sealing wall closer to a front of the automobile body.

7. A door weather strip configured to operably couple to a door of an automobile adjacently to a belt line, the door weather strip comprising:

a fin at a bottom of the door weather strip;

a main seal on an internal circumference on a surface of the fin, the main seal extending vertically in an upper and lower direction, the main seal having a top end;

a sub seal on an outer circumference on the surface of the fin, the sub seal extending vertically in the upper and lower direction, the sub seal having a top end, the main seal and the sub seal being configured to make elastic contact with an end of a roof weather strip on a circumferential edge of a door opening of an automobile body of the automobile to seal a gap between the door and the automobile body when the door is in a closed position;

a channel between the main seal and the sub seal; and a sealing wall configured to block up the channel, the sealing wall connecting the main seal and the sub seal, the sealing wall extending between the top end of the main seal and a part of the sub seal, the part of the sub seal being below the top end of the sub seal by a distance, such that the sealing wall on the sub seal is spaced from the end of the roof weather strip when the door is in the closed position, wherein a distance between a third intersection of the sealing wall and a fourth intersection of the sealing wall is wider than a distance between a first intersection of and a second intersection of the sealing wall, the first intersection being an intersection of the sealing wall with the main seal on a base root of the main seal on an upper side of the main seal, the second intersection being an intersection of the sealing wall with the main seal on the top end of the main seal on a lower side of the main seal, the third intersection being an intersection of the sealing wall with the sub seal on a base root of the sub seal on an upper side of the sub seal, and the fourth intersection being an intersection of the sealing wall with the sub seal below the top end of the sub seal on the lower side of the sub seal.

8. The door weather strip as claimed in claim 7, wherein the sealing wall is a plate and forms a space between the sealing wall and the fin.

9. The door weather strip as claimed in claim 8, wherein the sealing wall between the main seal and the sub seal gradually slopes such that a lower part of the sealing wall rises from the fin and approaches the top end of the main seal and the top end of the sub seal.

10. The door weather strip as claimed in claim 8, wherein the fourth intersection of the sealing wall is lower than the second intersection of the sealing wall, and wherein a bottom of the sealing wall gradually slopes downward, toward an exterior of the automobile body on a part of the sealing wall closer to a front of the automobile body.

11. The door weather strip as claimed in claim 7, wherein the sealing wall between the main seal and the sub seal gradually slopes such that a lower part of the sealing wall rises from the fin and approaches the top end of the main seal and the top end of the sub seal.

12. The door weather strip as claimed in claim 7, wherein the fourth intersection of the sealing wall is lower than the second intersection of the sealing wall, and wherein a bottom of the sealing wall gradually slopes downward, toward an exterior of the automobile body on a part of the sealing wall closer to a front of the automobile body.

* * * * *